United States Patent [19]
Stallard et al.

[11] Patent Number: 5,115,482
[45] Date of Patent: May 19, 1992

[54] OPTICAL APPARATUS FOR CONVERSION OF WHISPERING-GALLERY MODES INTO A FREE SPACE GAUSSIAN LIKE BEAM

[75] Inventors: Barry W. Stallard; Michael A. Makowski, both of Livermore; Jack A. Byers, Danville, all of Calif.

[73] Assignee: The United States of America as represented by the United States Department of Energy, Washington, D.C.

[21] Appl. No.: 711,693

[22] Filed: Jun. 7, 1991

[51] Int. Cl.⁵ .......................... G02B 6/26; H01P 1/16
[52] U.S. Cl. .......................... 385/28; 385/11; 385/37; 385/146; 385/147; 359/853; 333/21 R; 333/251
[58] Field of Search .............. 350/96.10, 96.15, 96.18, 350/96.19, 96.29, 96.30, 622; 333/21 R, 251, 230, 21 A; 385/11, 28, 37, 43, 133, 146, 147; 359/840, 846, 853, 857, 868

[56] References Cited

U.S. PATENT DOCUMENTS

| | | | |
|---|---|---|---|
| 4,381,137 | 4/1983 | Berg et al. | 350/96.15 X |
| 4,439,860 | 3/1984 | Kurnit | 372/70 |
| 4,521,075 | 6/1985 | Obenschain et al. | 350/162.11 |
| 4,942,623 | 7/1990 | Asawa et al. | 350/96.15 X |
| 4,992,763 | 2/1991 | Bert et al. | 333/219 |
| 5,030,929 | 7/1991 | Moeller | 333/251 |
| 5,043,629 | 8/1991 | Doane | 333/230 X |

Primary Examiner—Brian Healy
Attorney, Agent, or Firm—Henry P. Sartorio; Roger S. Gaither; William R. Moser

[57] ABSTRACT

An optical converter for efficient conversion of millimeter wavelength whispering-gallery gyrotron output into a linearly polarized, free-space Gaussian-like beam. The converter uses a mode-converting taper and three mirror optics. The first mirror has an azimuthal tilt to eliminate the $k_\phi$ component of the propagation vector of the gyrotron output beam. The second mirror has a twist reflector to linearly polarize the beam. The third mirror has a constant phase surface so the converter output is in phase.

18 Claims, 12 Drawing Sheets

OPTICAL APPARATUS FOR CONVERSION OF WHISPERING-GALLERY MODES INTO A FREE SPACE GAUSSIAN LIKE BEAM

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

The present invention relates to optical systems for converting electromagnetic radiation modes. More particularly, the present invention relates to optical systems for converting gyrotron waveguide output modes into free-space radiation modes suitable for multi-mirror or waveguide transmission. The present invention is probably best compared with a Vlasov antenna mode converter (S. N. Vlasov et al., *Radio Eng. Electron. Phys.* 20, 14, 1975), however it has higher efficiency than the Vlasov design, and its greater symmetry enables simpler performance analysis.

The primary application of the high-power, high-frequency gyrotrons developed over the last decade is in the electron cyclotron resonance heating (ECRH) of fusion plasmas. With ECRH the microwave energy generated by a gyrotron is channeled or transported to a plasma containment vessel via a waveguide or mirror system. However, one problem associated with increasing the output power and frequency of resonant-cavity gyrotrons is that of mode competition within the cavity. To alleviate this problem a class of rotating surface modes called "whispering-gallery" modes are used for operation because they have a relatively low mode competition, and the corresponding whispering-gallery output is in a well defined mode. Transverse electric Bessel function solutions $TE_{m,n}$, for which $m >> n$, describe the whispering-gallery modes. (Here m and n are the integers associated with the cylindrical variables $\phi$ and r, respectively.) Unfortunately, the whispering-gallery modes are not suitable for lengthy transmission from a gyrotron to a containment vessel.

Therefore there is a need to convert the whispering-gallery mode output of a gyrotron into a more suitable mode for practical applications requiring long distance transmission of the gyrotron power to the location it is used, e.g. to a plasma containment vessel. Long distance, low loss transmission may be accomplished with either a multi-mirror system or via a waveguide employing a suitable waveguide mode. A linearly polarized, Gaussian-like beam is suitable for coupling power to either mode of transmission.

SUMMARY OF THE INVENTION

It is an object of the present invention to provide an optical system for converting whispering-gallery microwaves to a linearly polarized, free-space Gaussian-like beam.

It is another object of the invention to provide an optical system which can be installed in the vacuum envelope of a gyrotron to separate the spent electron-beam from the generated radio frequency power.

It is a further object of the invention to provide an optical system which converts whispering-gallery modes into $TE_{0,n}$ modes, the $HE_{1,1}$ mode, or other suitable modes for low-loss transmission in waveguides.

It is still an additional object of the invention to provide a reversible optical system that generates a whispering-gallery mode by injecting a Gaussian-like beam into its output end.

These and other objects of the invention are realized by an optical converter that includes a taper at the waveguide output of a gyrotron and three mirror optics. The taper and optics perform as follows:

The primary purpose of the taper is to insure that the microwave power, which radiates from the waveguide as a diverging cone, is in a mode that has nearly all the power within a single lobe, i.e. the power is localized. The optics can then be made smaller for a given efficiency. The appropriate taper results in a mixture of waveguide modes at the output of the taper, with appropriate phasing between the modes, so the electric field component at large distances will be almost entirely $E_\phi$.

Once in free space the beam reflects off a first annular focusing mirror, called a counterbore reflector because it resembles a counterbore tool bit, that incorporates sawtooth-type steps into its reflecting surface. The surface of the counterbore mirror is adjusted to eliminate the $k_\phi$ component of the propagation vector k for the whispering-gallery mode. (Since whispering-gallery modes are rotating surface modes, $k_\phi \neq 0$.) The $k_\phi$ component results in $E_\phi$ having an undesirable $\cos(m\phi)$ angular dependence that prohibits subsequent linear polarization. However, $k_\phi$ is eliminated after reflection from the counterbore mirror, and, since it is also a focusing mirror, the reflected wave now forms a converging cone directed at a second optic, a twist reflector mirror.

With $E_\phi$ uniformly polarized in the phi direction the beam reflects off a linearly polarizing mirror which has twist reflector grooves, approximately a quarter wavelength deep, oriented to convert the $E_\phi$ field into a field that is linearly polarized in a single direction. (If the cos $(m\phi)$ dependence had not been eliminated the polarization would still be phi dependent.)

The final mirror is a phase-correcting optic. The incident converging conical beam from the twist reflector is reflected at the desired angle for transmission with a uniform phase across the beam, producing a linearly polarized output beam with a Gaussian-like electric field profile.

BRIEF DESCRIPTION OF THE DRAWINGS

The accompanying drawings, together with the description, serve to explain the principles of the invention.

DETAILED DESCRIPTION OF THE INVENTION

Figure 1:
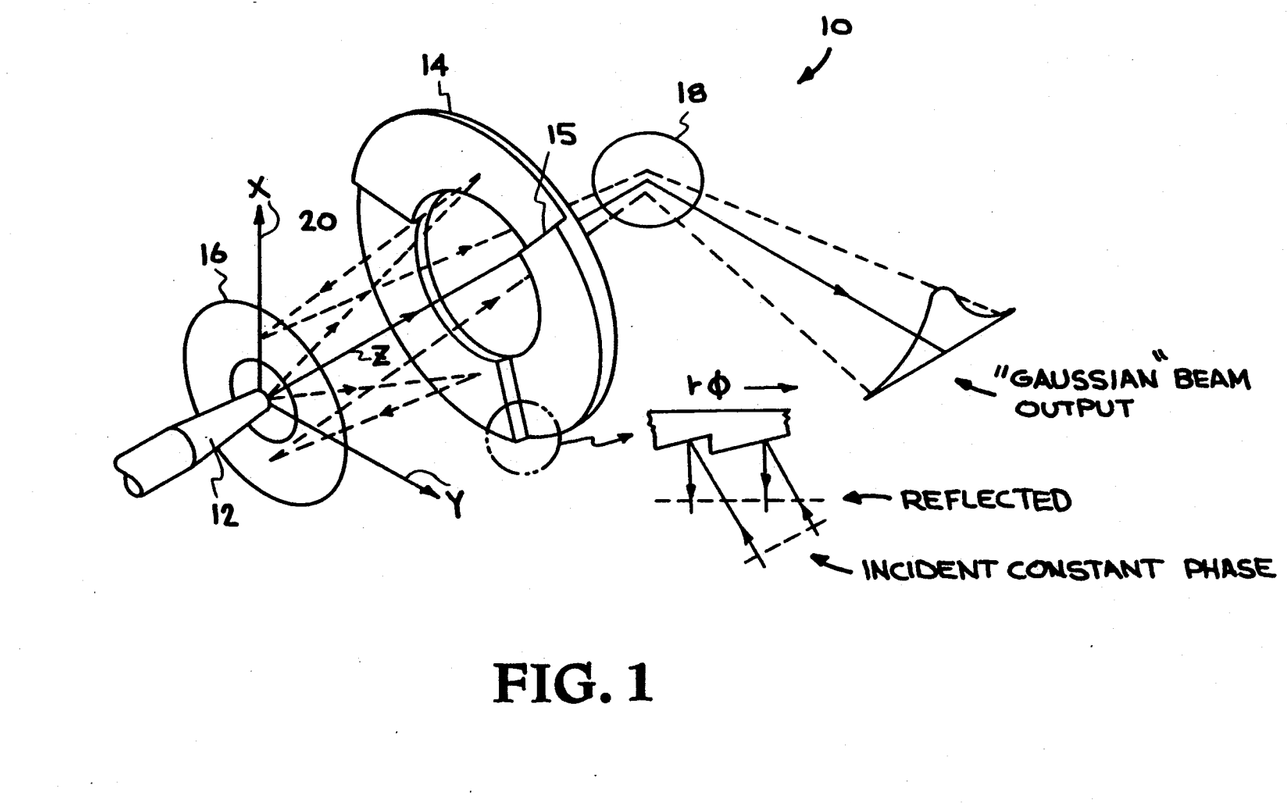
FIG. 1 illustrates an embodiment of the present invention.

Converter 10, as shown in FIG. 1, includes taper 12 at the end of a gyrotron waveguide output, focusing counterbore mirror 14 with steps 15, twist polarizer mirror 16, and phase corrector mirror 18. All components are oriented along the z axis of the system. The beam path is indicated by dotted lines 20. FIG. 1 also shows a detail of the incident and reflected beams off counterbore mirror 14 across a step 15.

The gyrotron output beam passes through taper 12, which is designed in a known manner, so the beam undergoes a transformation to mixed modes with appropriate relative phasing so that the only appreciable component to the electric field at large distances from the aperture (approx. 100 cm for a 2 inch aperture at 140 GHz) is the azimuthal $E_\phi$ field. With such a mode mixture most of the power is concentrated in a single lobe, enabling one to efficiently use smaller optics. Also, the design considerations for mirror 16 may be simplified somewhat with the elimination of the $E_\theta$ electric field component.

After leaving taper 12 the beam diverges in an annular fashion towards counterbore mirror 14 where the $k_\phi$ component of the propagation vector is eliminated after reflection off angled steps 15 on the surface of mirror 14. With the elimination of $k_\phi$ the cos $(m\phi)$ polarization dependence disappears, and $E_\phi$ is then uniformly polarized in a single direction around the annular beam. Since mirror 14 is also a focusing mirror the beam now converges towards twist polarizing mirror 16.

Reflection off mirror 16 linearly polarizes the beam, which travels through the central opening in mirror 14 to mirror 18. The surface on mirror 18 is shaped so the output of converter 10 will be in phase. Through the use of converter 10 the whispering-gallery output of a gyrotron is transformed to a linearly polarized, free-space beam with a localized Gaussian power distribution.

The effect of taper 12 in producing a localized beam is illustrated in FIGS. 2a-2d, and FIGS. 3a-3d. (The real parts of the electric field are given in arbitrary units. The imaginary parts of $E_\phi$ and $E_\theta$ and the H-plane field values are not shown to avoid redundancy.) The field amplitudes are taken in the far field (Fraunhofer region) so they remain proportional. The angle $\theta$ is taken with respect to the z axis with the origin at the aperture (shown in FIG. 4a).

FIGS. 2a-2d illustrate $TE_{15,2}$ single mode 140 GHz output with no taper and a 2 inch aperture at the end of the waveguide.

FIGS. 3a-3d illustrate a preferred in-phase mixture of the $TE_{15,2}$ and $TE_{15,3}$ mode 140 GHz output achieved by using an appropriate taper. The taper also has a 2 inch aperture.

Figure 2A:
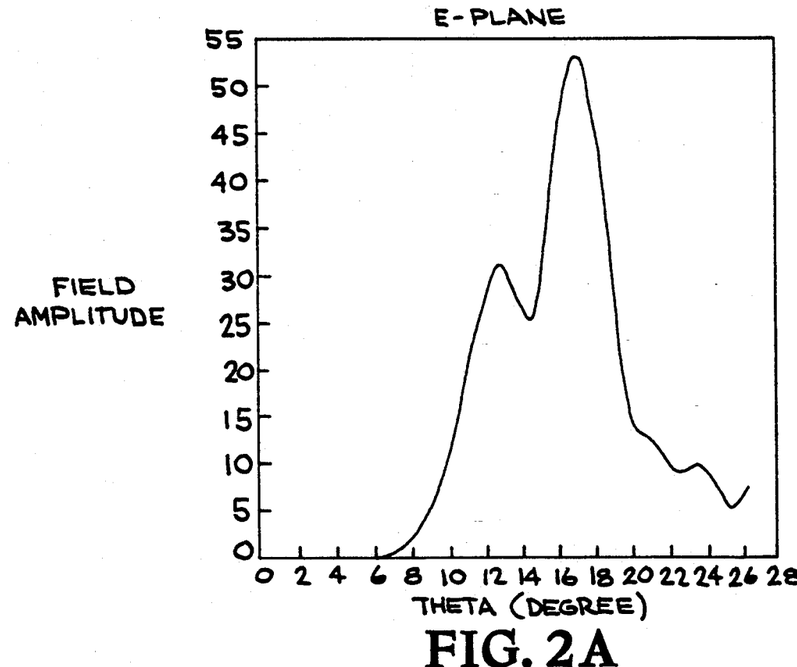
FIGS. 2a-2d illustrate a $TE_{15,2}$ single mode 140 GHz output of a taperless waveguide with a two inch aperture.
Figure 2B:
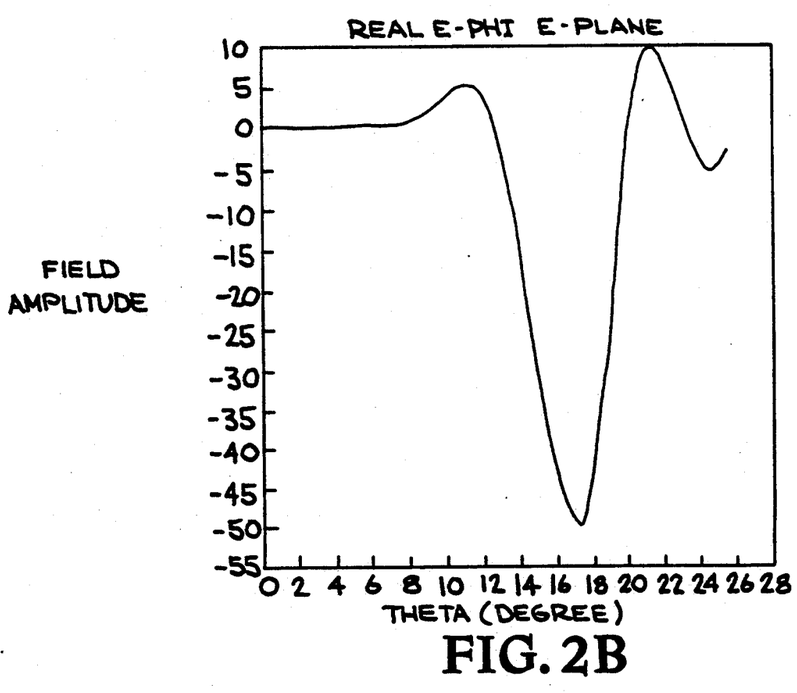
Figure 2C:
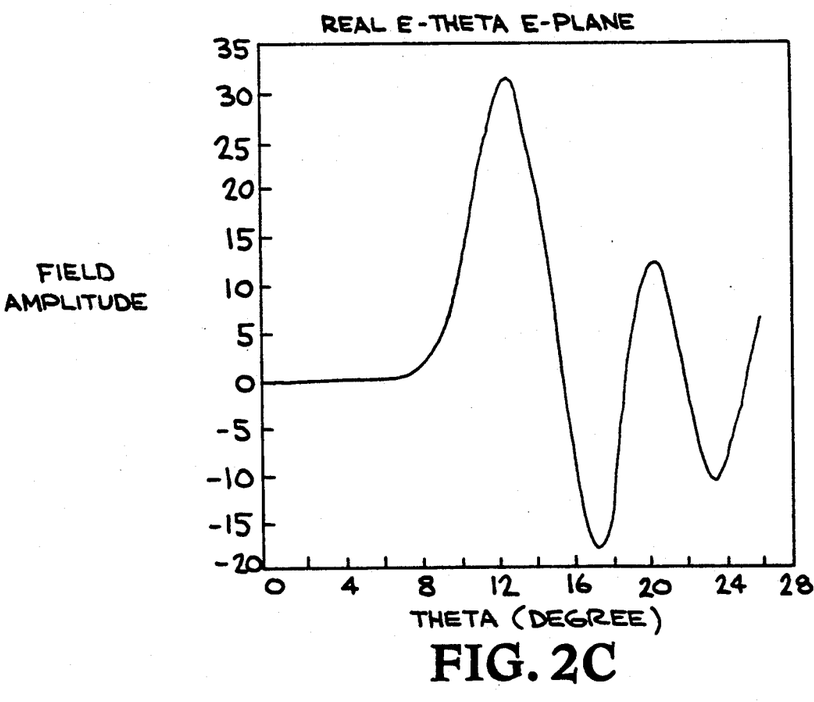
Figure 2D:
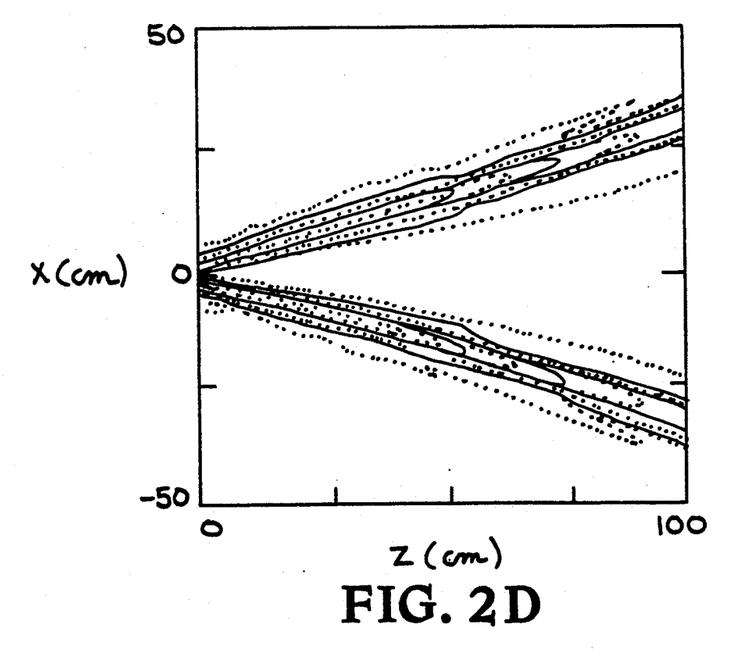

The single $TE_{15,2}$ mode electric field amplitude as a function of theta is shown in FIG. 2a. There is a sizable side-lobe at about 12 degrees, and several smaller side-lobes for increasing theta outside the peak. Comparing FIGS. 2b and 2c one sees that the $E_\theta$ field contribution is largely responsible for the side-lobes. The field is spread over 15 degrees or more, and the power is not localized in the main lobe. The field amplitude contours from the waveguide aperture are shown in FIG. 2d. The conical shape of the beam is evident from this drawing.

Figure 3A:
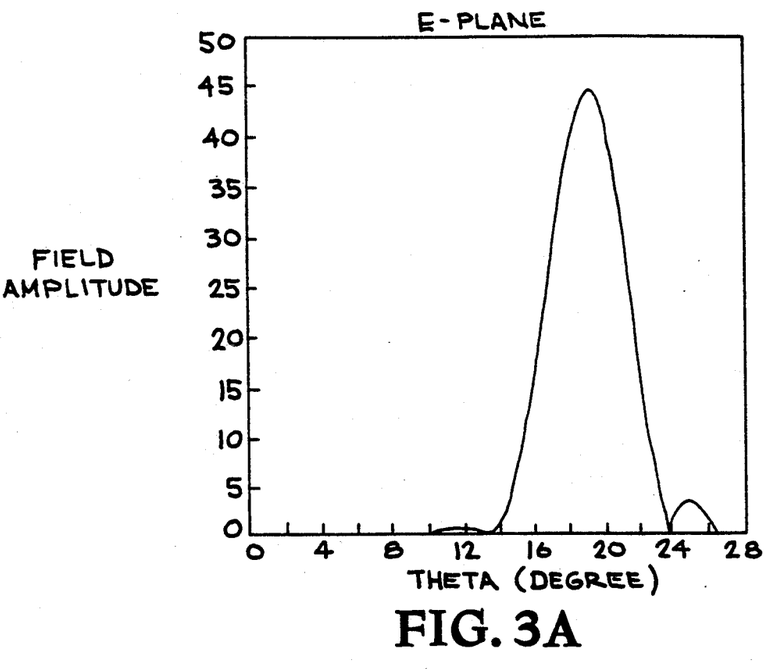
FIGS. 3a-3d illustrate a $TE_{15,2}$ and $TE_{15,3}$ mixed mode 140 GHz output of a tapered waveguide with a two inch aperture.
Figure 3B:
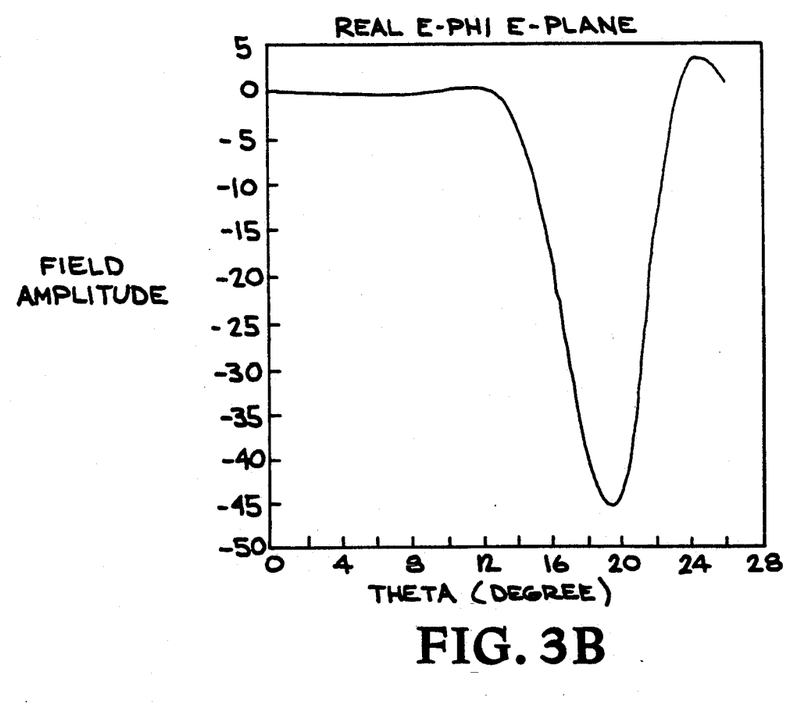
Figure 3C:
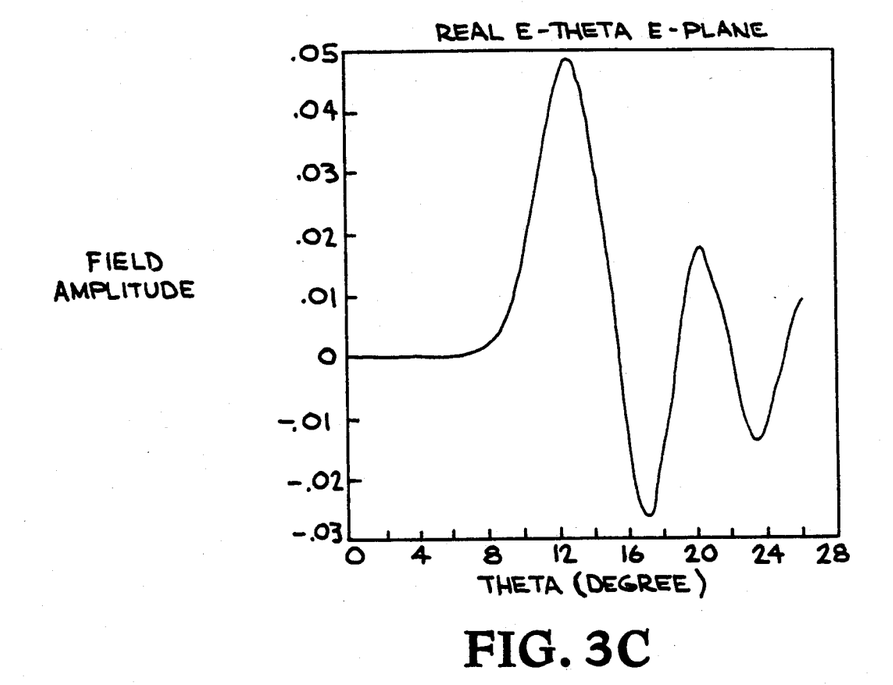
Figure 3D:
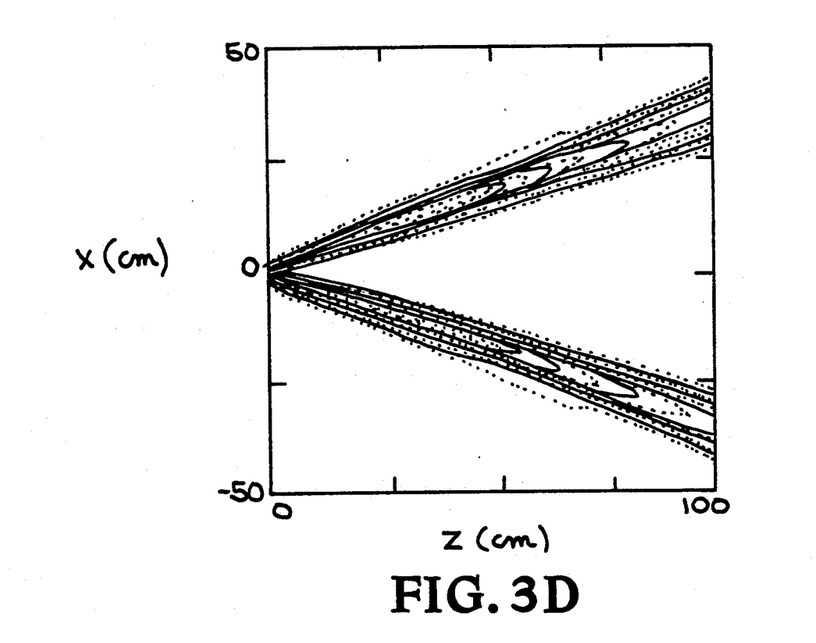

A preferred embodiment of the present invention employs a taper to convert the $TE_{15,2}$ mode discussed above into a $TE_{15,2}$ and $TE_{15,3}$ mixed mode with a power ratio of 0.58:1. The field amplitude is more localized than with a single mode, as is shown in FIG. 3a. $E_\phi$ is concentrated to a greater degree, with virtually no lobe at 12 degrees, and only a slight contribution at 25 degrees, as is shown in FIG. 3b. The radiated mixed mode is spread only over about 10 degrees, about one third less than the single mode. The $E_\theta$ component has dropped in magnitude by a factor of about 650, as can be seen by comparing FIGS. 2c and 3c. (Note the scale for $E_\theta$.) The more localized power distribution with the mixed mode can also be seen by comparing the cone-shaped field lines shown in FIGS. 2d and 3d. The optics can be made smaller when a taper is employed to generate an output with minimal power spread.

To design the mirror optics the "Microwave Transmission Huygens" code is used. This code calculates wave propagation by solving Huygens' equation for scalar diffraction. Starting with a source aperture field defined on an initial surface, the field on the next surface is calculated. This surface becomes the source for the next surface, and so on. Simple analytic functions with variable parameters are used for the mirror surfaces, and the final design is determined by iterating the parameters.

Figure 4A:
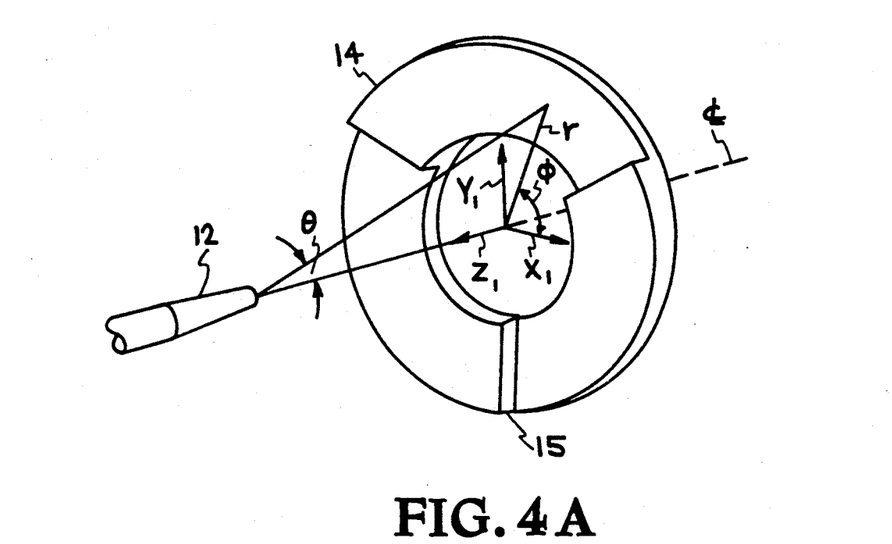
FIGS. 4a and 4b illustrate the counterbore mirror.

The details of the counterbore mirror 14, as seen in FIG. 4a, will now be discussed. Rotating surface modes, e.g. whispering-gallery modes, have propagation vectors with non-zero phi components given in the far field by $k_\phi \approx -m/r$. The desired output beam has $k_\phi = 0$ so there will be no azimuthal variation of $E_\phi$, and the purpose of mirror 14 is to produce a reflected beam with $k_\phi = 0$. This is accomplished by adding a slight azimuthal tilt to the surface of mirror 14 so that the normal to the mirror surface has a non-zero phi component $n_\phi$. Because of the tilt one or more steps 15 occur in the mirror surface for a $2\pi$ change in azimuthal angle. The phi component for the required surface normal n is determined from the reflection condition $k_r = k_i - 2n(n \cdot k_i)$, where the subscripts r and i respectively refer to the reflected and incident waves. Setting $k_{\phi r} = 0$ and $k_i \approx (k \sin\theta, -m/r, -k\cos\theta)$, the solution for $n_\phi$ is determined from;

$$0 = -m/r + 2n_\phi(n \cdot k_i) \qquad (1)$$

The surface of mirror 14 is found by adding the surface tilt to other desired optical focusing. Referring to the coordinate system of FIG. 4a, the surface of mirror 14 is given by $z_1 = F(r) + \delta(r,\phi)$, where F gives the optical focusing and $\delta$ is the counterbore surface. The surface normal is given by $n = \nabla(z_1 - F - \delta)/|\nabla(z_1 - F - \delta)|$. Using equation (1) and the definition for a surface normal, the equation for $\delta$ is:

$$n_\phi \approx -\frac{1}{r}(d\delta/d\phi)\left[1 + (dF/dr + d\delta/dr)^2 + \frac{1}{r}(d\delta/d\phi)^2\right]^{-\frac{1}{2}}$$

Assuming $$d\delta/dr \& \frac{1}{r}(d\delta/d\phi) < < dF/dr,$$

an approximate solution can be found for $\delta$:

$$\delta \approx -\frac{mg(\phi)}{2k} \sqrt{1 + [dF/dr]^2}/\{\cos\theta + (dF/dr)\sin\theta\}.$$

where k is the wave number $2\pi/\lambda$, $(r,\phi)$ are cylindrical coordinates measured from the center of mirror 14, and for p equal size steps in mirror 14 $g(\phi)$ is defined by:

$$g(\phi) = \phi - (l-1)\frac{2\pi}{p}, \text{ for } l - 1 < \frac{\phi p}{2\pi} \leq l,$$

$$l = 1, 2, \ldots p$$

For the 140 GHz design with the $TE_{15,2}$ and $TE_{15,3}$ mixed mode output, mirror 14 is an annular mirror with an inner radius of 18–20 cm and an outer radius of 50–55 cm positioned 50 cm from the aperture at the end of the waveguide taper. The radius of curvature is set equal to 75 cm. From geometric optics this curvature focuses the power from the waveguide at 150 cm from mirror 14. This value was chosen to provide a hollow and converging beam at mirror 16, with very low on-axis power at the waveguide, with the focal point after reflection from mirror 16 lying beyond mirror 14 with low interception on the inside edge of mirror 14.

Figure 4B:
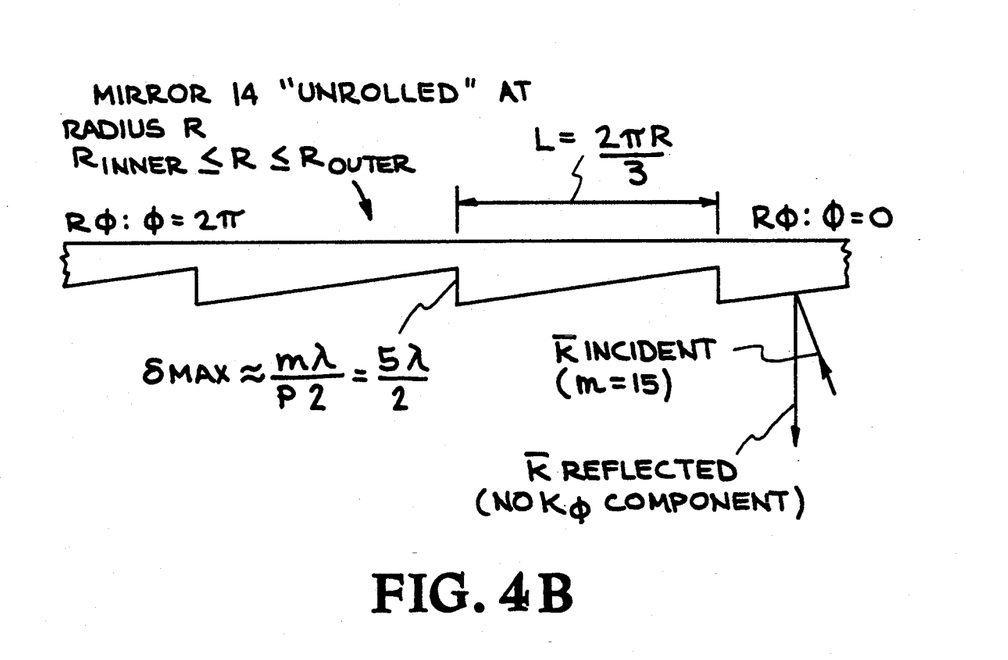

An "unrolled" side view of counterbore mirror 14 with three equal steps 15 is shown in FIG. 4b. The maximum height, $\delta_{max}$, of each step 15 occurs at the edge of the step, and is approximately $m\lambda/2p$, or $5\lambda/2$ for p=3. For the reflected rays to remain in phase across the edge of the step m/p must be an integer so the pathlength difference across the edge is an integral number of half-wavelengths. For an incident beam with m=15 the number of steps p may be 1, 3, 5, or 15. The present example has p=3, as shown in FIG. 4b. The length L of each step in the phi direction varies with the radial coordinate r; for p=3 and r=R, where R lies within the annulus, $L=2\pi R/3$.

In general, in deciding the number of steps there is a trade-off between scattering from a small number of large step edges, or from a larger number of small step edges with less azimuthal asymmetry in the reflected beam. In either case the perturbation caused by scattering off the step edges is very small.

Figure 5:
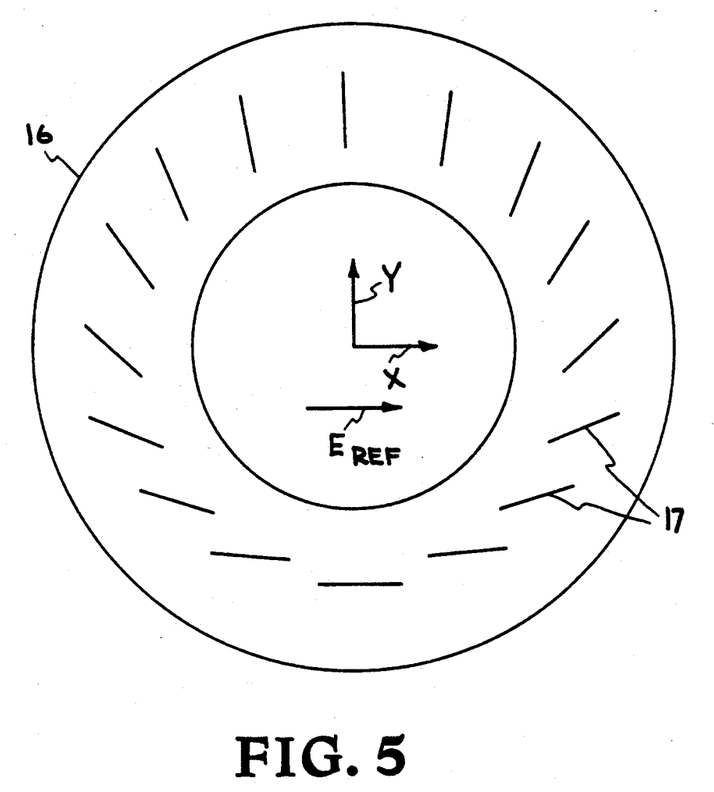
FIG. 5 illustrates the twist reflector mirror.

In preferred embodiment mirror 16 is an annular flat mirror with an inner radius of about 15 cm and an outer radius of 28–30 cm. The twist reflector (polarizing) surface comprises grooves 17, as shown in FIG. 5. (Only the general orientation of several of the grooves is seen in FIG. 5. It should be noted that the coordinate system is rotated 90° with respect to the coordinate system of FIG. 1, and is viewed facing mirror 16.) It is located at the same axial position as the end of waveguide taper 12 so the waveguide output beam goes through the central opening in mirror 16. When the beam reflects back from mirror 14 towards mirror 16 very little is on the z axis of the waveguide, an important factor in preventing the reflection of power back into the gyrotron.

Grooves 17 on the surface of mirror 16 are approximately $\lambda/4$ deep, and separated by less than a wavelength to avoid higher order diffractive scattering. The field component incident upon mirror 16 is predominantly $E_\phi$. To produce a reflected beam with linear polarization the groove direction varies with azimuthal angle. For groove direction s, the reflected electric field is given by:

$$E_r = E_i - 2s(s \cdot E_i)$$

The reflected electric field components normal, $E_{nr}$, and tangential, $E_{tr}$, to mirror 16 are:

$$E_{nr} = E_{ni} = n(n \cdot E_i) \text{ and } E_{tr} = E_r - E_{nr}$$

The groove direction may be determined from the known incident field, and the desired polarization of the reflected field. For an incident field with pure $E_\phi$ polarization and for a reflected field linearly polarized in the x direction ($E_{yr} = 0$), the groove equation is given by:

$$dy/dx = \tan\left[\frac{1}{2}(\phi + \pi/2)\right]$$

Grooves 17 are parabolic defining parabolas that change along the y axis from infinitely wide at the bottom of mirror 16 to infinitely narrow (a straight vertical line) at the top of mirror 16. Grooves 17 are symmetrical about the y axis.

Note that the direction of the electric field in the linearly polarized output beam may be changed by an arbitrary angle by rotating mirror 16 about its axis by the same angle. Also, mirror 16 is not restricted to polarizing a pure $E_\phi$ field. Mirror 16 may be rotated to polarize a field with both an $E_\phi$ and an $E_\theta$ component, but since the beam has traveled from the end of taper 12 to mirror 16 via mirror 14, the approximation is for the far field, and the field is dominated by the $E_\phi$ component.

Figure 6:
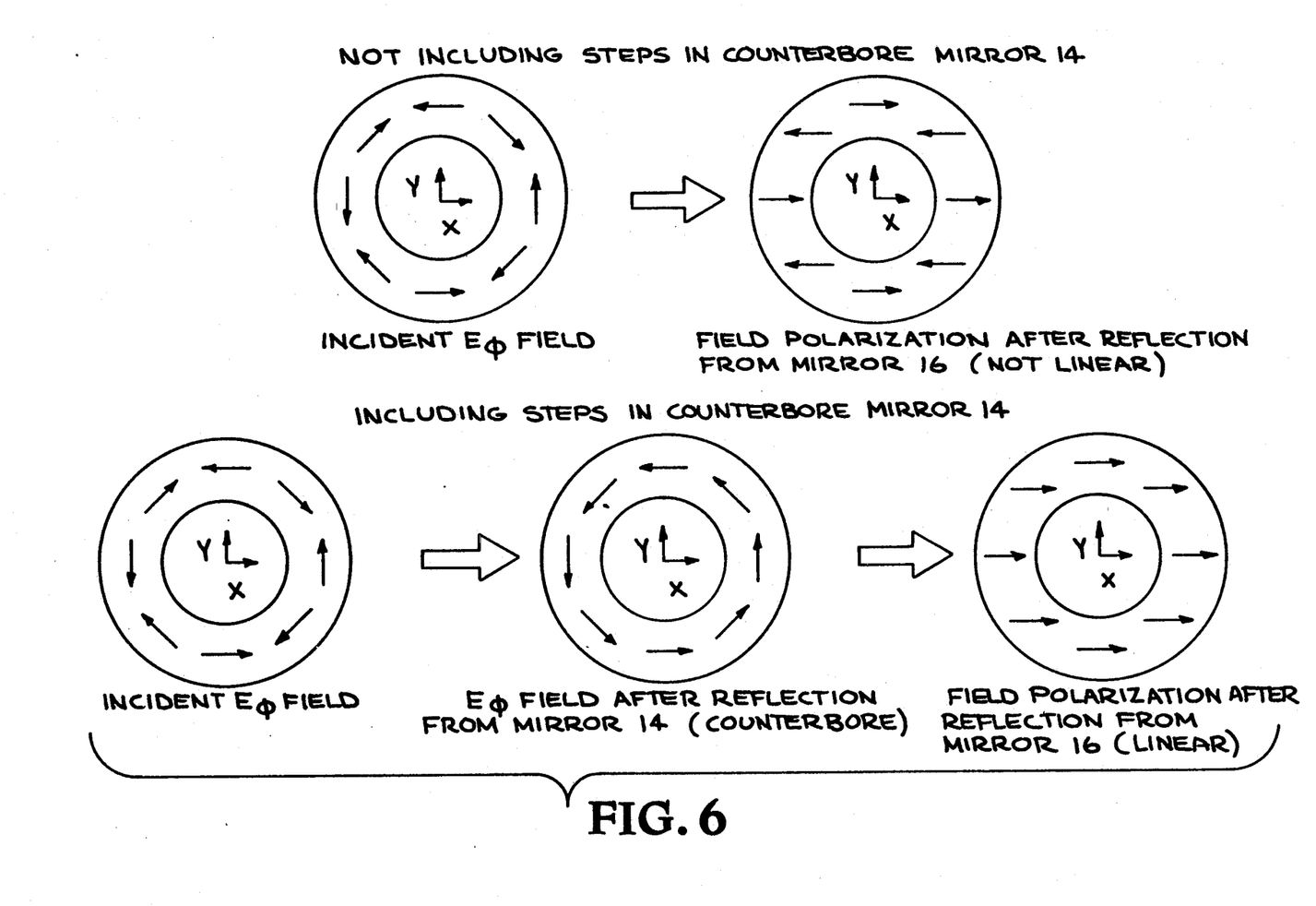
FIG. 6 illustrates the field polarization with and without the counterbore mirror.

The role of mirrors 14 and 16 can be more clearly understood from FIG. 6, which shows the $E_\phi$ field polarization for the beam incident upon counterbore reflector 14, and the field polarization after reflection from mirror 16, both with and without steps in the surface of intermediate counterbore mirror 14. The incident $E_\phi$ field has a $\cos(m\phi)$ polarization dependence because $k_\phi \neq 0$ for rotating gyrotron output modes such as the preferred whispering-gallery modes. Without mirror 14 the beam reflected off mirror 16 still has a $k_\phi$ component, and consequently a $\cos(m\phi)$ polarization dependence. The result is the beam becomes polarized along the x axis, but alternates direction with $\cos(m\phi)$ as phi is varied. (The coordinate system is the same as in FIG. 5.)

In accordance with the present invention, steps in mirror 14 are utilized and the $k_\phi$ dependence is removed. $E_\phi$ then becomes uniformly polarized in the phi direction after reflection from mirror 14, and the field is uniformly polarized in the x direction after reflection from mirror 16. (It should be noted that for m=15 the polarization direction alternates every 12 degrees with a $\cos(m\phi)$ dependence since $12 \times 15 = 180$. To avoid undue crowding the number of arrows in FIG. 6 indicating polarization direction is reduced.)

Figure 7A:
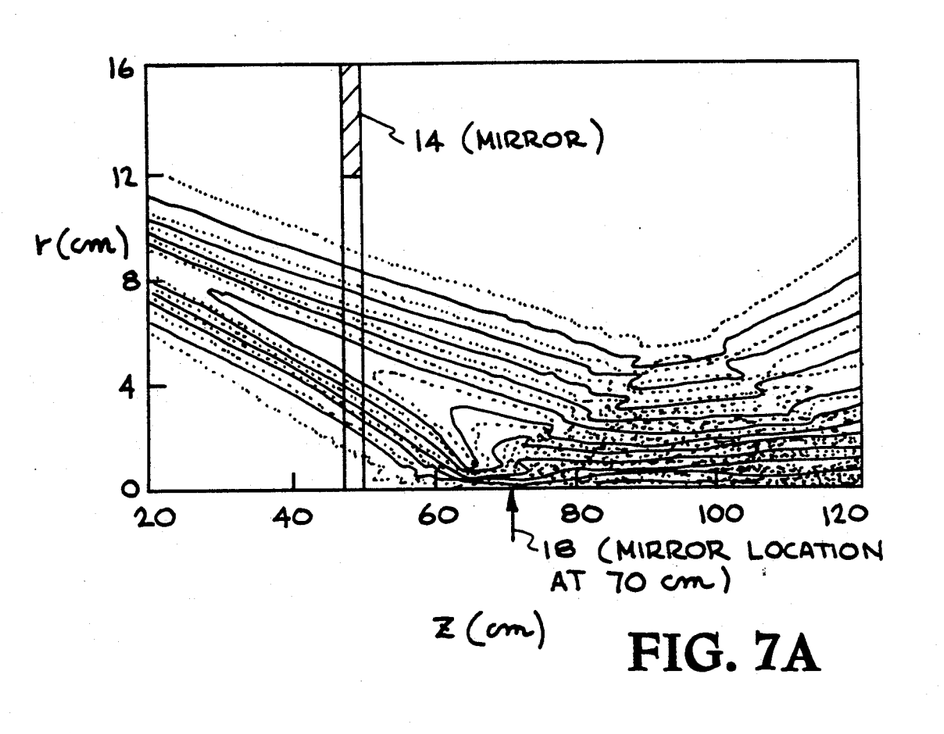
FIGS. 7a-7c illustrate the beam profile at the phase corrector mirror.

The radius of curvature of mirror 14 is chosen to produce a converging annular beam. The converging beam, after reflection from mirror 16, propagates through the central opening in annular mirror 14, and is linearly polarized with $k_\phi = 0$. From geometric optics the focal point of the beam is 100 cm from mirror 16, but because of diffraction the beam reaches a focus slightly before the 100 cm location. FIG. 7a shows the electric field amplitude contours along one half of the beam in the vicinity of the focal point. (The z axis bisects the beam.) The inside edge of mirror 14 is sketched in the figure to show there is negligible beam interception by mirror 14 after reflection from mirror 16.

The optimal position for mirror 18 is close enough to the focal point so that the converging portions of the annular beam overlap to form a central Gaussian-shaped amplitude profile, but in front of the focal point to avoid strong interference. There is some latitude in choosing mirror 18's position. For the present design mirror 18 is placed 70 cm from mirror 16, as is shown in FIG. 7a. (However, mirror 18 can also be placed beyond the focal point, where the amplitude profile is again Gaussian-like.)

To calculate the surface for mirror 18 an approximate constant phase surface is first calculated for a 180 degree reflection, i.e. the converging annular beam would be reflected as a diverging annular beam back towards mirror 16 if a mirror with that surface were placed 70 cm from mirror 16. After the constant phase surface is calculated an algorithm for mirror rotation is used to calculate the actual mirror surface for reflection at the desired angle.

Figure 7B:
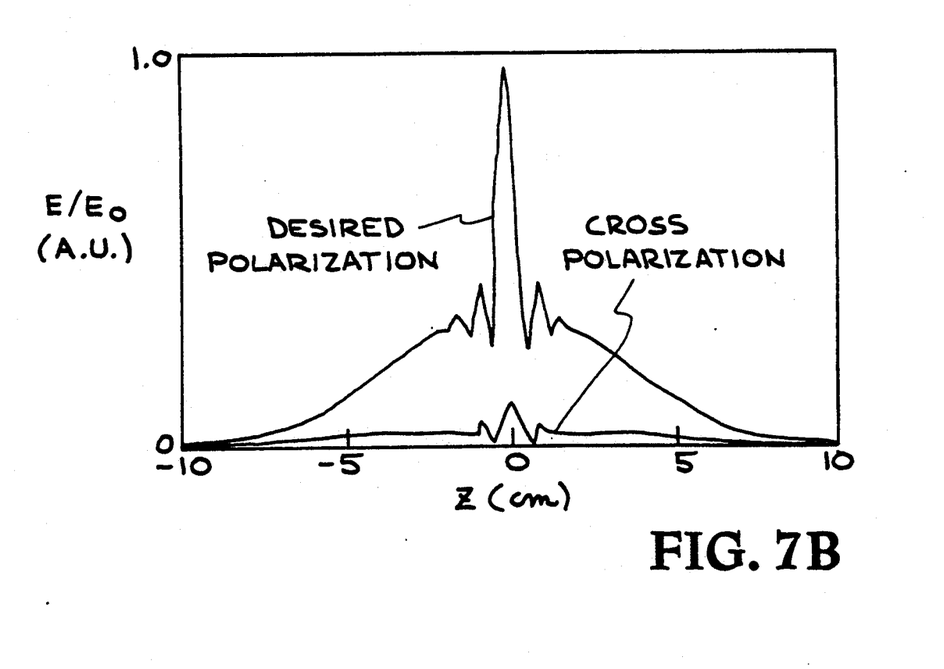
Figure 7C:
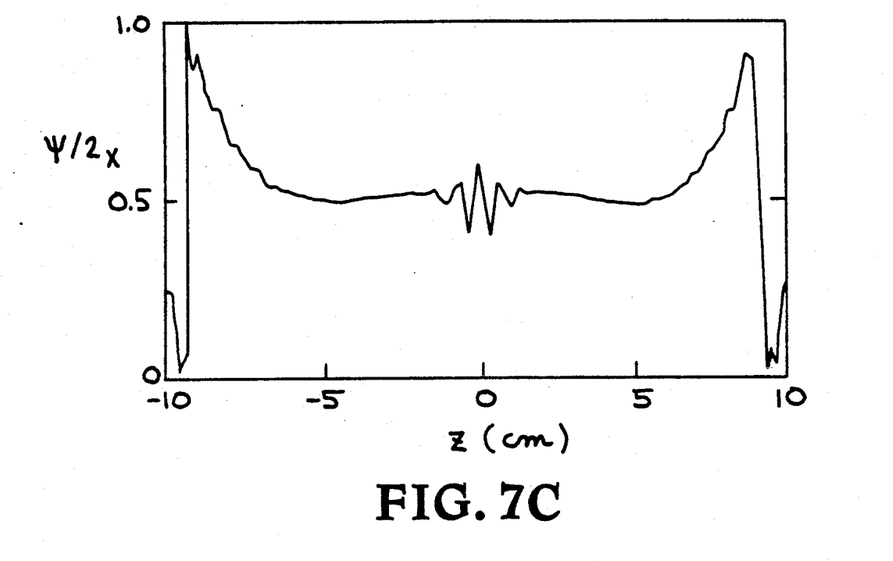

The functional form assumed for the constant phase surface is $z_3 = a_{lin}r + a_{sq}r^2$, where $a_{lin}$ and $a_{sq}$ are the parameters for the respective linear and squared terms in the approximation. (The coordinate system is the same type as that used in calculating the counterbore surface, with $z_3$ as the height of the surface and r the distance from the z axis.) The appropriate values of $a_{lin}$ and $a_{sq}$ yield a constant phase surface for the incident beam. The values for the parameters are $a_{lin} = -0.147$ m$^{-1}$ and $a_{sq} = 0.50$ m$^{-2}$. FIG. 7b shows the amplitude profile across the entire beam (on the constant phase surface given above) with the desired polarization (•) and the cross-polarization components (∆) at 70 cm from mirror 16. There is some spatial ripple near the beam center due to interference, but the amplitude profile is predominantly Gaussian-shaped. FIG. 7c shows the phase for the beam across the constant phase surface. Except for the outside edge of the beam, where the amplitude is very small, the surface is indeed approximately of constant phase.

The beam incident upon mirror 18 is converging at a small angle $\theta$ with respect to the z axis, and a 180° reflection would yield a slightly diverging reflected beam. To produce a reflected beam that is neither converging or diverging a small angle approximation is made, and the parameter values are reduced by a factor of 2. A mirror with this surface would reflect the converging beam back towards taper 12 in the center of mirror 16, and the beam would have flat, parallel constant phase surfaces.

In the present embodiment mirror 18 is oriented to reflect the beam away from the system (or z) axis at 90 degrees. To produce an output beam reflected at 90 degrees from the incident beam, an algorithm for mirror rotation (in this case it is the "constant phase surface" that is rotated) through 45 degrees is used. If the rotation takes place around an S axis, and P is the perpendicular axis in the plane of rotation, the equation for the surface of mirror 18 is:

$$z_3 = a_{lin}[p^2 + (\sqrt{2}\,s)^2]^{0.5}(1 - a_{sq}p/\sqrt{2}) +$$

$$a_{sq}[p^2/\sqrt{2} + \sqrt{2}\,s^2](1 - \sqrt{2}\,a_{sq}p),$$

where $a_{lin} = -0.0735$ m$^{-1}$, $a_{sq} = 0.25$ m$^{-2}$, and s and p are the position coordinates along their respective axes corresponding to mirror surface height $z_3 = z_3(s,p)$.

Figure 8:
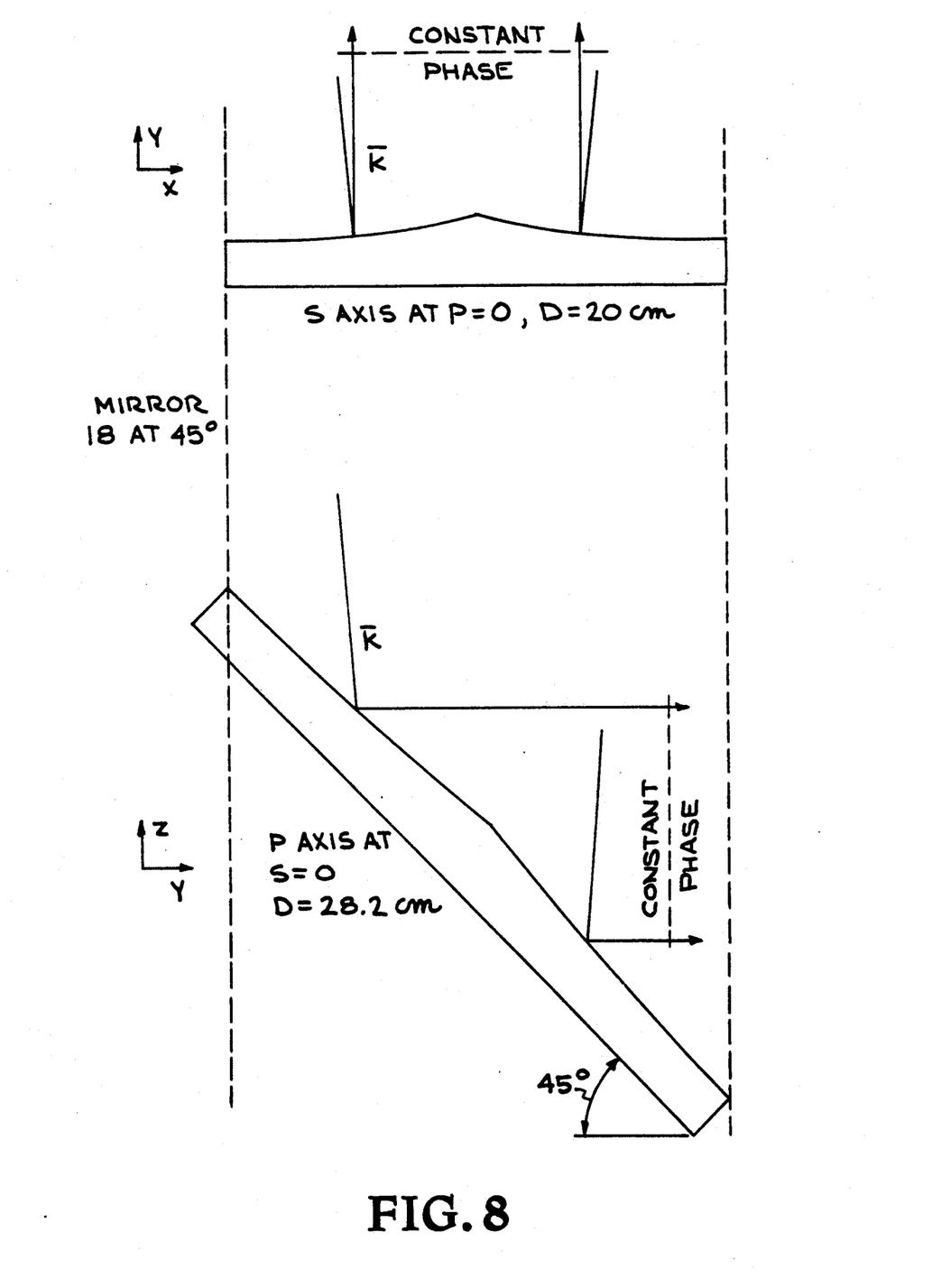
FIG. 8 illustrates the phase corrector mirror.

Cross-sections of mirror 18 along the S and P axes are as shown in FIG. 8. Mirror 18 preferably is cross-sectionally equivalent to a 16-20 cm mirror in the x-y plane. For a 90° reflection and a 45° orientation with respect to the x-y plane the diameter of mirror 18 along the P axis is increased by a factor of $\sqrt{2}$ so that its projection along the y axis is 20 cm. Flat, parallel constant phase surfaces immediately following reflection from mirror 18 are defined by cross-sections of the beam perpendicular to the direction of propagation. The output beam in this embodiment is suited for multi-mirror transmission. Alternatively, mirror 18 may include focusing so the output can be coupled to a waveguide mode such as the $HE_{1,1}$ mode suitable for long distance transmission.

Figure 9A:
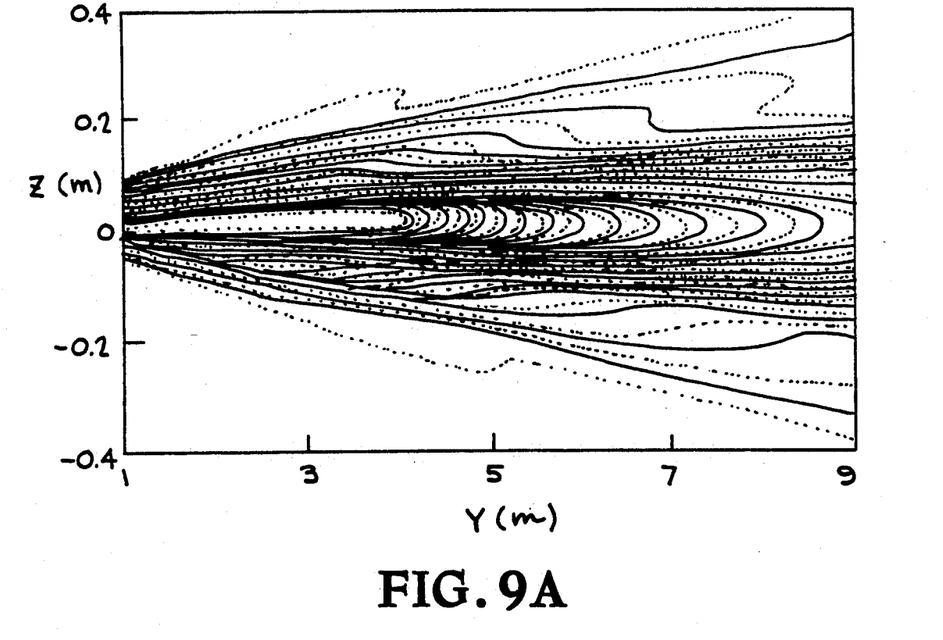
FIGS. 9a-9c illustrate the output beam after reflection from the phase corrector mirror.

The contours of the electric field amplitude for the final output of converter 10 are plotted in FIG. 9a. The beam is now traveling in the y direction, and is seen to be peaked on axis with small divergence and low side lobe amplitude.

Figure 9B:
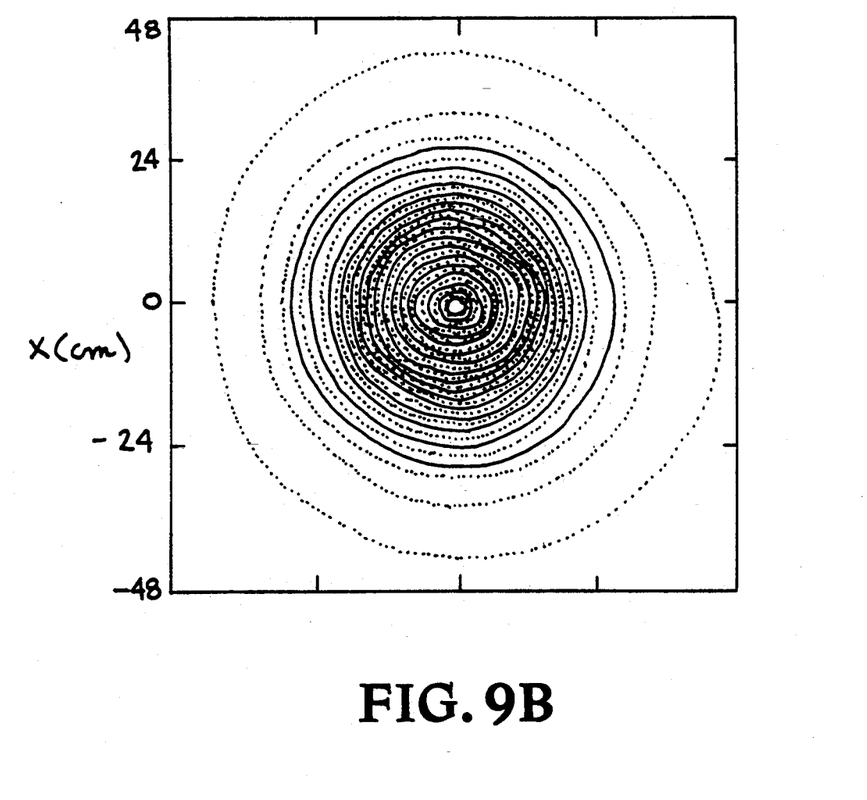
Figure 9C:
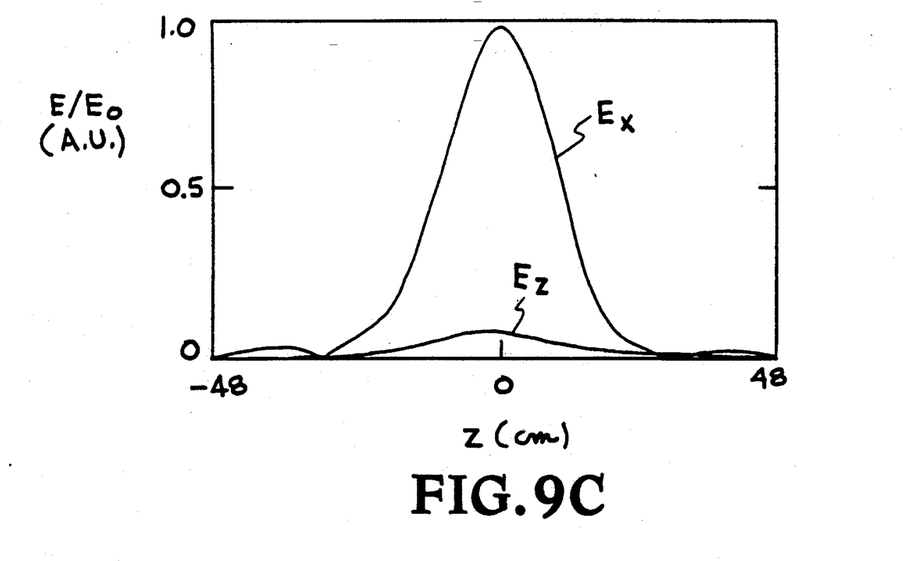

The beam at 8 meters is shown in FIGS. 9b and 9c. As can be seen from the contour plot of the cross-section in FIG. 9b the beam is very symmetric. The radial amplitude profile shown in FIG. 9c is Gaussian-like. The field polarization profiles of the x component $E_x$ (•) and of the z component $E_z$ (∆) indicate the total integrated beam power is >99% polarized in one direction. Since the electric field components are in phase, the total electric field is linearly polarized and rotated about 4° out of the x-y plane. By rotating twist reflector 16 one may change the orientation of the polarization to any direction in the x-z plane.

The integrated output beam power within the central lobe (out to r=28 cm) exceeds 96% of the total beam power. The efficiency may be further improved somewhat by perturbing the surfaces of mirrors 14 and 16 to reduce the large amplitude peak at r=0 in FIG. 7b.

The output beam may then be transmitted to a plasma containment vessel using a multi-mirror system, or by focusing into a corrugated waveguide for coupling to the low loss $HE_{11}$ mode.

Other applications include:

Converter 10 may be enclosed within the vacuum envelope of a gyrotron to separate the generated microwave power from the spent electronbeam. By using an up-taper and a short phase-matching straight waveguide section at the output of the cavity within the gyrotron, the appropriate mixed mode with low sidelobe power may be obtained. The sides of the intervening distance between the waveguide section and mirror 14 can be used to dump the spent electron-beam at any convenient large radius. Mirror 18 may be placed either inside or outside the vacuum envelope. If inside, the output beam is Gaussian-like, and the power profile on the vacuum window is peaked on axis. If mirror 18 is placed outside the vacuum envelope the power profile on the window is annular, and additional control of the output beam is possible through adjustments of the final optic.

If mirror 16 does not include the twist reflecting grooves, the output beam consists of a spectrum of $TE_{On}$ modes. By appropriately shaping the mirror curvatures the spectrum may be adjusted, and the output beam power may be coupled to $TE_{On}$ modes in a smooth wall waveguide for low loss transmission as an alternative to $HE_{11}$ mode transmission in a corrugated waveguide.

The input to the converter does not have to be in whispering-gallery modes—it may be in $TE_{On}$ modes. In this case the steps on the counterbore mirror are not needed. The input may also be in rotating surface modes that are not whispering-gallery modes.

Other mode combinations are possible using various tapers. A mixture of the $TE_{15,1}$ and $TE_{15,2}$ modes also produces a radiated beam suitable for the present invention. Conversion of TM modes is also possible.

By changing the tilt of steps 15 one may change the azimuthal index m and change from one whispering-gallery mode to another. The twist reflector would not be needed for this application.

Converter 10 may be operated "backwards" by directing a Gaussian-shaped polarized beam onto mirror 18 to generate a whispering-gallery mode for low power testing of components.

The optics may be changed:

For instance, the twist reflector surface may be incorporated into the counterbore mirror. Also, all the optics may include focusing. The steps on the counterbore mirror need not all be the same size, nor do they need to be uniformly spaced along the azimuthal direction.

Still other modifications and variations are possible. The full scope of the invention is only intended to be limited by the claims.

We claim:

1. An optical apparatus comprising:
    an aperture at the end of a tubular waveguide, and first, second, and third mirrors having reflective surfaces and arranged along an axis so that said axis passes through said aperture and said three mirrors wherein;
    said first mirror has a central opening which said axis passes through and is positioned away from said waveguide in front of said aperture;
    said second mirror has a central opening which said axis passes through and is positioned closer to said aperture than said first mirror;
    said third mirror is solid where said axis passes through and is positioned farther from said aperture than said first mirror.

2. The apparatus of claim 1 wherein said end of said waveguide comprises a tapered section ending at said aperture, said tapered section including a portion with a changing cross-section.

3. The apparatus of claim 1 wherein said reflective surface of said first mirror is tilted in the azimuthal direction around said axis, and said reflective surface includes one or more radially directed steps positioned around said azimuthal direction so that;
    said one or more steps offset the changes in the level of said reflective surface caused by said tilt.

4. The apparatus of claim 3 wherein said first mirror is curved to have a focal length.

5. The apparatus of claim 1 wherein said reflective surface of said second mirror has grooves formed therein.

6. The apparatus of claim 5 wherein said grooves are parabolic.

7. The apparatus of claim 1 wherein said third mirror skewed with respect to said axis so that radiation incident along said axis will be reflected in a direction different from the direction of said axis.

8. An optical apparatus comprising: an aperture at the end of a tubular waveguide, and first, second, and third mirrors having reflective surfaces and arranged along an axis so that said axis passes through said aperture and said three mirrors wherein;
    said first mirror has a central opening which said axis passes through and is positioned away from said waveguide in front of said aperture;
    said second mirror has a central opening which said axis passes through and is positioned closer to said aperture than said first mirror;
    said third mirror is solid where said axis passes through and is positioned farther from said aperture than said first mirror, wherein;
    said waveguide emits radiation via said aperture, and;
    said radiation is reflected from said first, second, and third mirrors consecutively.

9. The apparatus of claim 8 wherein said end of said waveguide comprises a tapered section ending at said aperture, said tapered section including a portion with a changing cross-section, wherein;
    said radiation is in a single mode in said waveguide and in a mixed mode after leaving said aperture.

10. The apparatus of claim 8 wherein said radiation has a propagation vector with a non-zero azimuthal component with respect to said axis after leaving said aperture, and;
    the azimuthal component of said propagation vector with respect to said axis equals zero after reflection from said first mirror.

11. The apparatus of claim 8 wherein said radiation is linearly polarized after reflection from said second mirror.

12. The apparatus of claim 8 wherein said radiation has flat, parallel, cross-sectional constant phase surfaces perpendicular to the direction of propagation after reflection from said third mirror.

13. The apparatus of claim 8 wherein said radiation emerges from said aperture as a diverging cone, and;
    after reflection from said third mirror said radiation is a linearly polarized beam with a Gaussian-shaped amplitude profile having a central peak, with flat, parallel, cross-sectional constant phase surfaces perpendicular to the direction of propagation, and;
    said direction of propagation is different from the direction of said axis.

14. An optical converter comprising: an aperture at the end of a tubular waveguide that is tapered near the aperture so as to have a changing cross-section, and;
    first, second, and third mirrors having reflective surfaces and arranged along an axis so that said axis passes through said aperture and said three mirrors wherein;
    said first mirror has a central opening which said axis passes through and is positioned away from said waveguide in front of said aperture, and;
    said reflective surface of said first mirror is tilted in the azimuthal direction around said axis, and said reflective surface includes one or more radially directed steps positioned around said azimuthal direction so that;
    said one or more steps offset the changes in the level of said reflective surface caused by said tilt;
    said second mirror has a central opening which said axis passes through and is positioned closer to said aperture than said first mirror, and;
    said reflective surface of said second mirror has parabolic grooves formed therein;

said third mirror is solid where said axis passes through and is positioned farther from said aperture than said first mirror, wherein;

said waveguide emits radiation via said aperture, and;

said radiation is reflected from said first, second, and third mirrors consecutively, wherein;

after reflection from said third mirror said radiation is a linearly polarized beam with a Gaussian-shaped amplitude profile having a central peak, with flat, parallel, cross-sectional constant phase surfaces perpendicular to the direction of propagation, and;

said direction of propagation is different from the direction of said axis.

15. A mirror with a reflecting surface having a height and an annular configuration so as to define perpendicular azimuthal and radial directions with respect to the center of said mirror comprising:

a tilt in said reflecting surface interrupted with one or more radial steps, wherein;

said tilt causes the height of said reflecting surface to monotonically increase in the azimuthal direction between steps, and;

said steps decrease the height of said reflecting surface in the azimuthal direction by an amount equal to the increase caused by the tilt.

16. An annular mirror and radiation incident upon said mirror comprising:

parabolic grooves in said mirror oriented symmetrically so the parabolas defined by said grooves are symmetric about an axis that bisects said mirror, and;

the depth of said grooves is one quarter the wavelength of said incident radiation, and;

said grooves are separated by less than the wavelength of said incident radiation.

17. A mirror and incident radiation propagating symmetrically about an axis that goes through said mirror, and reflected radiation propagating in a direction different from the direction of said axis, wherein;

said mirror is shaped so said radiation has flat, parallel, constant phase surfaces perpendicular to the direction of propagation after reflection.

18. An optical converter with an input and an output comprising:

a beam of radiation in a first mode entering said input, and in a second mode leaving said output, wherein;

after entering said input the radiation undergoes at least a first reflection from a first annular mirror with a first central opening, and a second reflection from a second annular mirror with a second central opening that directs the radiation through said first central opening, and;

said radiation in a first mode enters said input via a waveguide, and;

said second mode is linearly polarized with a Gaussian-like amplitude profile across a cross-section of said beam.

* * * * *